(12) United States Patent
Kim et al.

(10) Patent No.: US 10,575,139 B2
(45) Date of Patent: Feb. 25, 2020

(54) METHOD FOR PROVIDING BROADCAST SERVICE IN WIRELESS COMMUNICATION SYSTEM, AND APPARATUS THEREFOR

(71) Applicant: LG ELECTRONICS INC., Seoul (KR)

(72) Inventors: Laeyoung Kim, Seoul (KR); Youngdae Lee, Seoul (KR); Jinsook Ryu, Seoul (KR); Hyunsook Kim, Seoul (KR); Jaehyun Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/574,078

(22) PCT Filed: May 16, 2016

(86) PCT No.: PCT/KR2016/005173
§ 371 (c)(1),
(2) Date: Nov. 14, 2017

(87) PCT Pub. No.: WO2016/186414
PCT Pub. Date: Nov. 24, 2016

(65) Prior Publication Data
US 2018/0302754 A1    Oct. 18, 2018

Related U.S. Application Data

(60) Provisional application No. 62/161,888, filed on May 15, 2015.

(51) Int. Cl.
*H04W 4/06* (2009.01)
*H04W 88/04* (2009.01)
(Continued)

(52) U.S. Cl.
CPC .............. *H04W 4/06* (2013.01); *H04W 76/40* (2018.02); *H04W 88/04* (2013.01); *H04W 4/021* (2013.01); *H04W 92/18* (2013.01)

(58) Field of Classification Search
CPC ......... H04W 76/11; H04W 4/00; H04W 4/06; H04W 72/005
(Continued)

(56) References Cited

U.S. PATENT DOCUMENTS

2005/0076369 A1    4/2005    Cai et al.
2009/0219848 A1    9/2009    Lohmar et al.
(Continued)

FOREIGN PATENT DOCUMENTS

WO    WO 2009/043389 A1    4/2009
WO    WO 2014/126424 A1    8/2014
(Continued)

OTHER PUBLICATIONS

3GPP, "3rd Generation Partnership Project; Technical Specification Group Services and System Aspects; Study on Architecture Enhancements to Support Proximity-Based Services (ProSe) (Release 12)", 3GPP TR 23.703 V12.0.0, Feb. 2014, pp. 1-324.
(Continued)

*Primary Examiner* — Melvin C Marcelo
*Assistant Examiner* — Natali Pascual Peguero
(74) *Attorney, Agent, or Firm* — Birch, Stewart, Kolasch & Birch, LLP

(57) ABSTRACT

An embodiment of the present invention relates to a method for providing a broadcast service to a remote UE by a relay UE in a wireless communication system, the method comprising the steps of: receiving a TMGI monitoring request from a remote UE; and determining whether to provide a service to the remote UE on the basis of information included in the TMGI monitoring request, wherein the
(Continued)

TMGI monitoring request includes a TMGI and an MBMS SAI, and the relay UE provides a broadcast service to the remote UE when the MBMS SAI corresponds to an SAI received from system information.

12 Claims, 10 Drawing Sheets

(51) Int. Cl.
  *H04W 76/40* (2018.01)
  *H04W 92/18* (2009.01)
  *H04W 4/021* (2018.01)

(58) Field of Classification Search
  USPC .................................................. 370/310, 312
  See application file for complete search history.

(56) References Cited

U.S. PATENT DOCUMENTS

| | | | |
|---|---|---|---|
| 2012/0236776 A1* | 9/2012 | Zhang | H04W 48/12 370/312 |
| 2013/0128768 A1 | 5/2013 | Balasubramanian et al. | |
| 2013/0294321 A1 | 11/2013 | Wang et al. | |
| 2014/0355507 A1 | 12/2014 | Amerga et al. | |
| 2014/0355508 A1 | 12/2014 | Anchan et al. | |
| 2015/0029866 A1 | 1/2015 | Liao et al. | |
| 2016/0050558 A1 | 2/2016 | Wallentin et al. | |
| 2016/0234806 A1 | 8/2016 | Le Thierry D'Ennequin et al. | |
| 2016/0344726 A1 | 11/2016 | Stojanovski et al. | |

FOREIGN PATENT DOCUMENTS

| | | |
|---|---|---|
| WO | WO 2014/210185 A1 | 12/2014 |
| WO | WO 2015/014317 A1 | 2/2015 |
| WO | WO 2015/020386 A1 | 2/2015 |
| WO | WO 2015/046944 A1 | 4/2015 |
| WO | WO 2015/064074 A1 | 5/2015 |

OTHER PUBLICATIONS

Huawei et al, "eMBMS Traffic Relay Enhancement", SA WG2 Meeting #108, S2-150829, San Jose Del Cabo, Mexico, Apr. 13-17, 2015, pp. 1-4.

Alcatel-Lucent et al., "Resolution of TR 23.713 Section 7.2 FFS Topics," SA WG2 Meeting #107, S2-150646, (revision of 52-150556), SA WG2 Temporary Document, Sorrento, Italy, Jan. 26-30, 2015, pp. 1-8, XP050961700.

Alcatel-Lucent, "eMBMS Relay," SA WG2 Meeting #101 bis, S2-140629, (revision of S2-14xxxx), SA WG2 Temporary Document, San Jose Del Cabo, Mexico, Feb. 17-21, 2014, pp. 1-6, XP050770187.

\* cited by examiner

FIG. 7
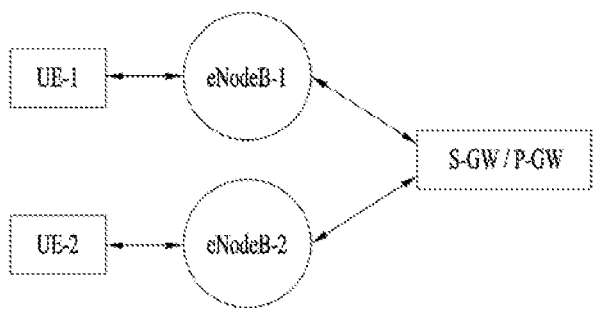
FIG. 8
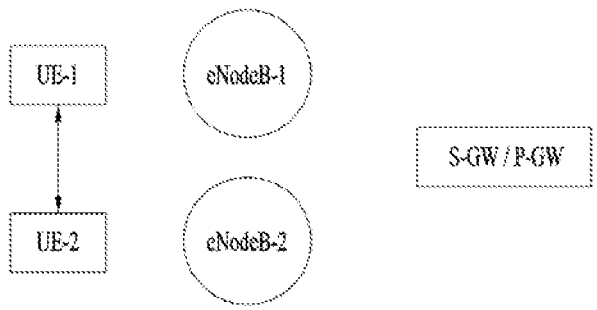
(a) UE-1 and UE-2 camp on different eNodeBs
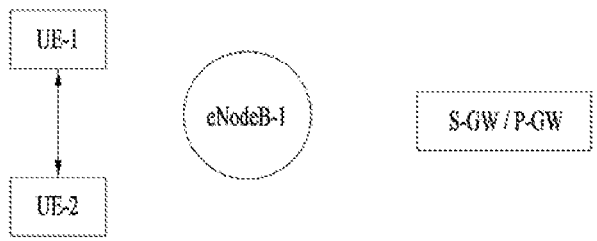
(b) UE-1 and UE-2 camp on the same eNodeB

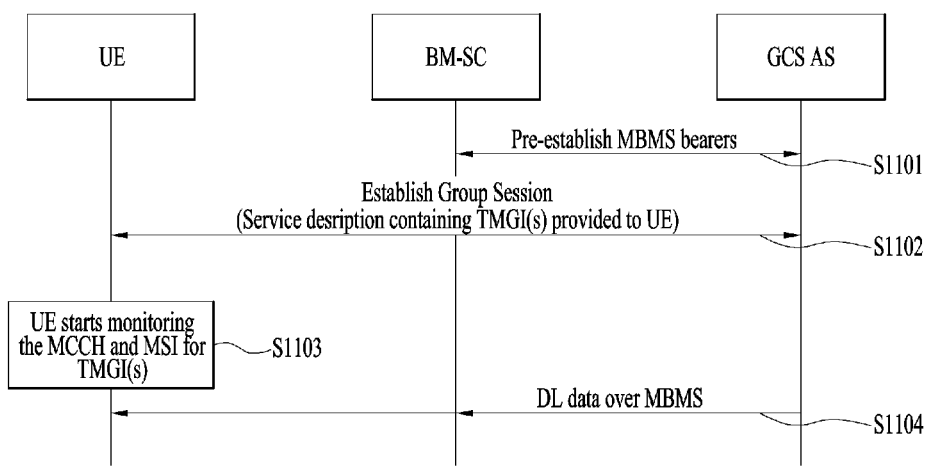

METHOD FOR PROVIDING BROADCAST SERVICE IN WIRELESS COMMUNICATION SYSTEM, AND APPARATUS THEREFOR

CROSS REFERENCE TO RELATED APPLICATIONS

This application is the National Phase of PCT International Application No. PCT/KR2016/005173, filed on May 16, 2016, which claims priority under 35 U.S.C. 119(e) to U.S. Provisional Application No. 62/161,888, filed on May 15, 2015, all of which are hereby expressly incorporated by reference into the present application.

TECHNICAL FIELD

The following description relates to a wireless communication system and, more particularly, to a method and apparatus for providing a broadcast service.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DETAILED DESCRIPTION OF THE INVENTION

Technical Problems

An object of the present invention is to provide a method of providing a broadcast service by a relay node.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method of providing a broadcast service by a relay User Equipment (UE) to a remote UE in a wireless communication system, including receiving a Temporary Mobile Group Identity (TMGI) monitoring request from the remote UE; and determining whether to provide a service to the remote UE, based on information included in the TMGI monitoring request, wherein the TMGI monitoring request includes a TMGI and a Multimedia Broadcast Multicast Service (MBMS) Service Area Identity (SAI), and if the MBMS SAI corresponds to an SAI received in system information, the relay UE provides the broadcast service to the remote UE.

In another aspect of the present invention, provided herein is relay User Equipment (UE) for providing a broadcast service in a wireless communication system, including a transceiver; and a processor, wherein the processor is configured to receive a Temporary Mobile Group Identity (TMGI) monitoring request from a remote UE and determine whether to provide a service to the remote UE, based on information included in the TMGI monitoring request, the TMGI monitoring request includes a TMGI and Multimedia Broadcast Multicast Service (MBMS) Service Area Identity (SAI), and if the MBMS SAI corresponds to an SAI received in system information, the relay UE provides the broadcast service to the remote UE.

The TMGI and MBMS SAI included in the TMGI monitoring request may be included in a service description obtained by the remote UE.

The service description may be transmitted by a group communication application.

The system information may be system information block 15.

The relay UE may transmit a TMGI monitoring response including a Proximity Service (ProSe) layer-2 group ID to the remote UE.

The TMGI and the MBMS SAI may constitute one information set and the TMGI monitoring request may include a plurality of information sets.

Advantageous Effects

According to the present invention, a remote UE can more flexibly and rapidly perform group communication.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 7 illustrates a data path through an EPS.

FIGS. 8 and 9 illustrate data paths in a direct mode.

FIG. 11 is a diagram for explaining use of a pre-established MBMS bearer.

FIG. 12 is a diagram for explaining a TMGI.

BEST MODE FOR CARRYING OUT THE INVENTION

Figure 1:
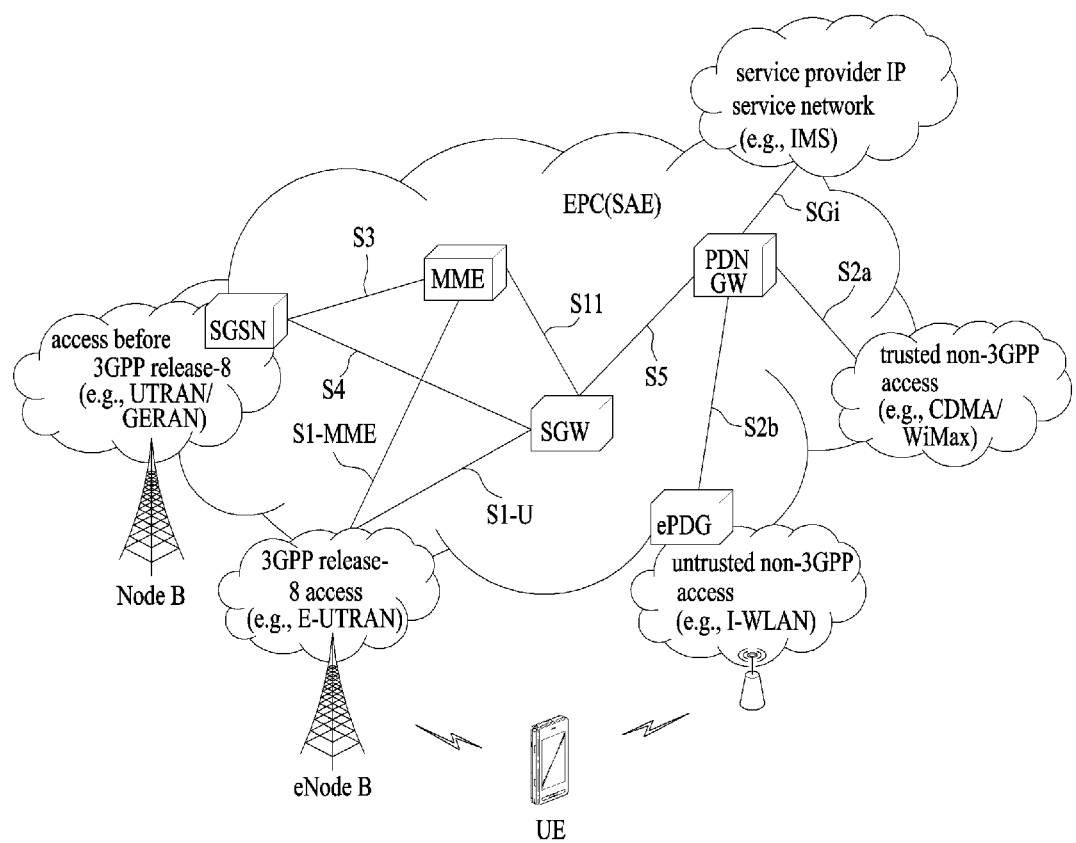
FIG. 1 is a schematic diagram showing the structure of an evolved packet system (EPS) including an evolved packet core (EPC).

The embodiments below are combinations of components and features of the present invention in a prescribed form.

Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC (SUPL Location Center) function and SPC (SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060].

MBSFN (MBMS Single Frequency Network): Simulcast transmission technique which is implemented by transmitting the same waveform to a plurality of grouped cells covering a certain area.

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
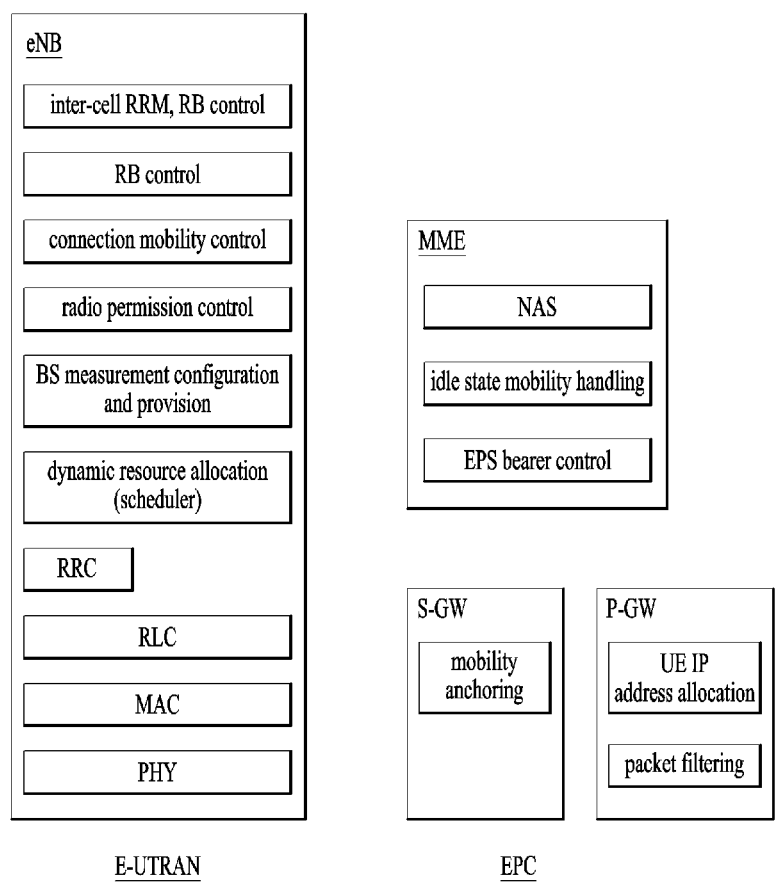
FIG. 2 is a diagram exemplarily illustrating architectures of a typical E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
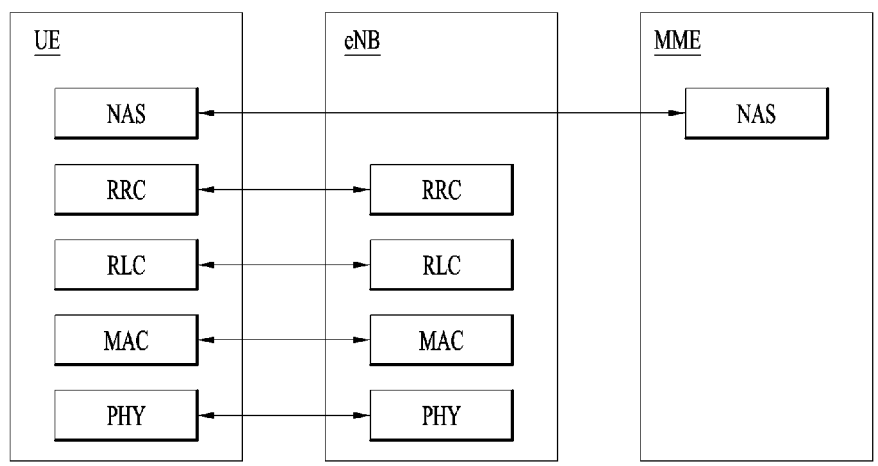
FIG. 3 is a diagram exemplarily illustrating the structure of a radio interface protocol in a control plane.
Figure 4:
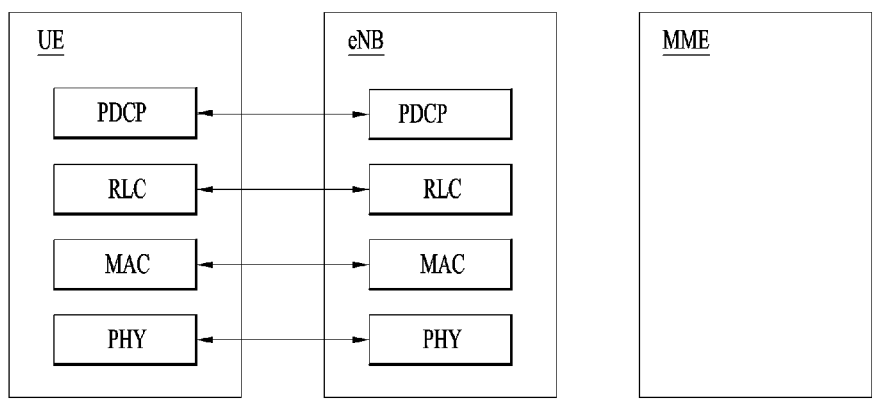
FIG. 4 is a diagram exemplarily illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PIRCH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
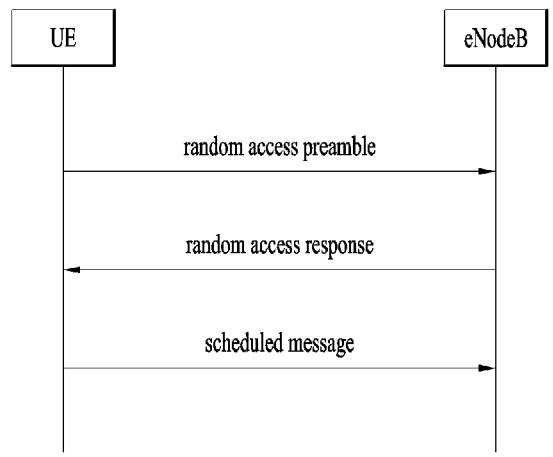
FIG. 5 is a flowchart illustrating a random access procedure

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
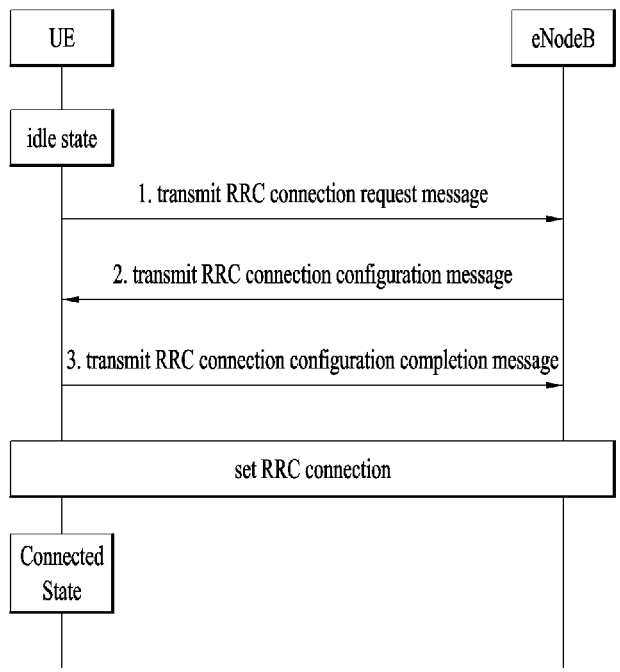
FIG. 6 illustrates a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

ProSe (Proximity Service)

ProSe refers to a service for enabling discovery and mutual direct communication between physically adjacent devices, communication via an eNodeB, or communication via a third device.

FIG. 7 is a view illustrating a default data path for communication between two UEs in an EPS. The default data path passes through an eNodeB and a core network (i.e., an EPC) managed by an operator. In the present invention, such a default data path may be referred to as an infrastructure data path (or an EPC path). In addition, communication via the infrastructure data path may be referred to as infrastructure communication.

FIG. 8 illustrates a direct mode data path between two UEs based on ProSe. Such a direct mode communication path does not pass through the eNodeB and a core network (i.e., an EPC) managed by an operator. FIG. 8(a) illustrates the case in which UE-1 and UE-2 camp on different eNodeBs and exchange data through a direct mode communication path. FIG. 8(b) illustrates the case in which UE-1 and UE-2 camp on the same eNodeB and exchange data through a direct mode communication path.

Figure 9:
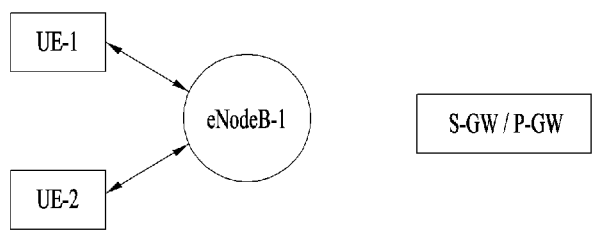

FIG. 9 illustrates a locally routed data path between two UEs via an eNodeB based on ProSe. This communication path via the eNodeB does not pass through a core network (e.g., an EPC) managed by an operator.

Meanwhile, in 3GPP Release 13, a solution for providing a mobile communication service in an E-UTRAN which has no connection with or is disconnected with a backhaul (i.e., a core network) and in an E-UTRAN which has a limited connection with the backhaul has been studied (3GPP SP-140714). As described above, the E-UTRAN which has no connection with or is disconnected with the backhaul (i.e., the core network) and the E-UTRAN which has a limited connection with the backhaul are called isolated E-UTRANs. Particularly, a mobile communication service in the isolated E-UTRAN is provided for a public safety UE/scenario. An operation of the isolated E-UTRAN is referred to as Isolated E-UTRAN Operation for Public Safety (TOPS). TOPS assumes the case of "No backhaul", "Limited bandwidth signaling only backhaul", or "Limited bandwidth signaling and user data backhaul".

Figure 10:
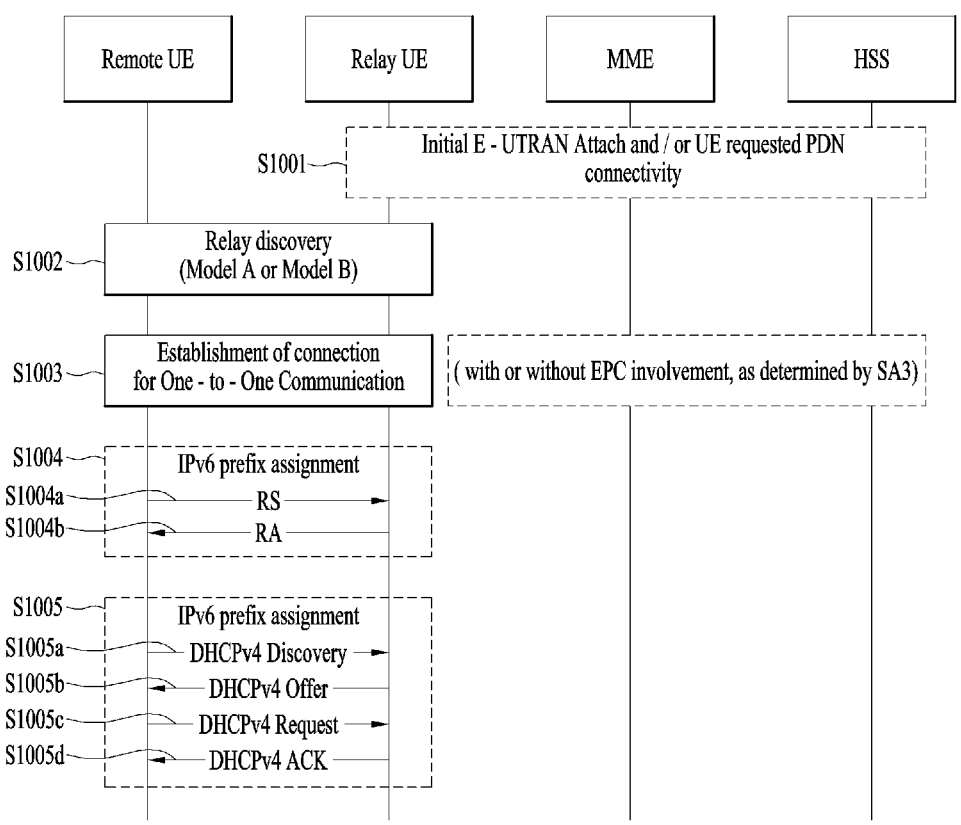
FIG. 10 illustrates a ProSe UE-to network relay procedure.

FIG. 10 illustrates a procedure in which a remote UE discovers a UE-to-network relay and establishes one-to-one direct communication to prepare for a connection service to a network. For more details of the procedure, reference may be made to TR 23.713.

In step S1001, a UE-to-network relay performs an initial attachment process to an E-UTRAN and/or establishes a PDN connection for relaying. In the case of IPv6, the relay obtains an IPv6 prefix via a prefix delegation function.

In step S1002, the remote UE performs discovery of the UE-to-network relay using Model A or Model B discovery.

Model A discovery is direct discovery in which an announcing UE informs UEs in proximity thereof that the announcing UE is present and a monitoring UE monitors whether the announcing UE that announces information of interest is present in a proximity area. Model B discovery is direct discovery in which a discoverer UE transmits a request containing information about what the UE is interested to discover and a discoveree UE responds with information related to the request of the discoverer.

In step S1003, the remote UE selects the UE-to-network relay and establishes a connection for one-to-one communication.

In step S1004, the remote UE performs IPv6 stateless address auto-configuration when IPv6 is used on PC5. The remote UE transmits a Router Solicitation message to the network using a destination layer-2 ID. A Router Advertisement message includes an assigned IPv6 prefix. After receiving the Router Advertisement message, the remote UE constructs a full IPv6 address via IPv6 stateless address auto-configuration. However, the remote UE should not use any identifiers defined in TS 23.003 as the basis for generating an interface identifier. For privacy, the remote UE changes the interface identifier used to generate the full IPv6 address without involving the network. The remote UE should use an auto-configured IPv6 address while sending packets.

In step S1005, the remote UE uses DHCPv4 when IPv4 is used on PC5. The remote UE should send a DHCPv4 Discovery message using the destination layer-2 ID. The relay acting as a DHCPv4 server sends a DHCPv4 offer with an assigned remote UE IPv4 address. Upon receiving a lease offer, the remote UE sends a DHCP REQUEST message containing a received IPv4 address. The relay acting as the DHCPv4 server sends a DHCPACK message including a lease duration and configuration information that a client has requested to the remote UE. Upon receiving the DHCPACK message, the remote UE completes a TCP/IP configuration process.

FIG. 11 is a diagram for explaining use of a pre-established MBMS bearer. Referring to FIG. 11, in step S1101, a Group Communication Service Application Server (GCS AS) pre-establishes MBMS bearers for a group communication session. A Broadcast Multicast Service Center (BM-SC) returns an MBMS service description associated with the MBMS bearers to the GCS AS. In step S1102, the UE establishes a group communication session with the GCS AS. The GCS AS passes the service description associated with an MBMS bearer service to a UE. The UE obtains TMGI(s) identifying the MBMS bearer(s) from the service description. In step S1103, the UE monitors a Multicast Control Channel (MCCH) and Multicast Channel Scheduling Information (MSI) of received MBSFN broadcast(s) for the TMGI(s). In step S1104, upon detecting a TMGI on the MCCH, the UE monitors DL data received on an MTCH corresponding to the MSI and the TMGI.

Meanwhile, information about the TMGI may refer to Section 10.5.6.13 of TS 24.008. The TMGI is used for group paging in an MBMS and may be as indicated in FIG. 12.

Hereinafter, a method of providing an MBMS according to embodiments of the present invention based on the above description will be described with reference to FIG. 13. The relationship between network nodes illustrated in FIG. 13 may be as indicated in FIG. 14. Notably, FIG. 14 is illustrated for convenience of description, and FIG. 13 and a description of FIG. 13 do not depend on a location of each node, construction, and a network environment illustrated in FIG. 14. In FIG. 14, a group communication application is located in an application domain and may be normally located in a third-party application server instead of belonging to a mobile communication operator. A remote UE may be located out of coverage and, therefore, cannot receive system information from an eNB. As illustrated in FIG. 14, evolved Multimedia Broadcast Multicast Service (eMBMS) traffic related to a TMGI, i.e., broadcast content, may be relayed via a one-to-many link identified by a ProSe layer-2 group ID from a relay UE to the remote UE.

Figure 13:
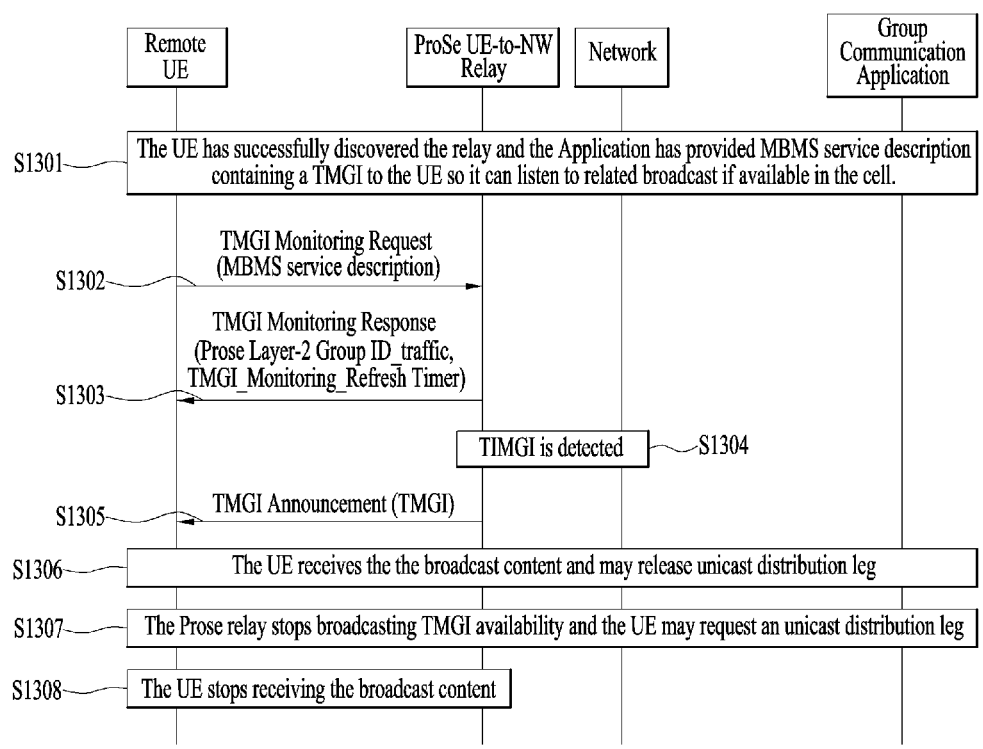
FIGS. 13 and 14 are diagrams for explaining a broadcast service related operation according to an embodiment of the present invention.
Figure 14:
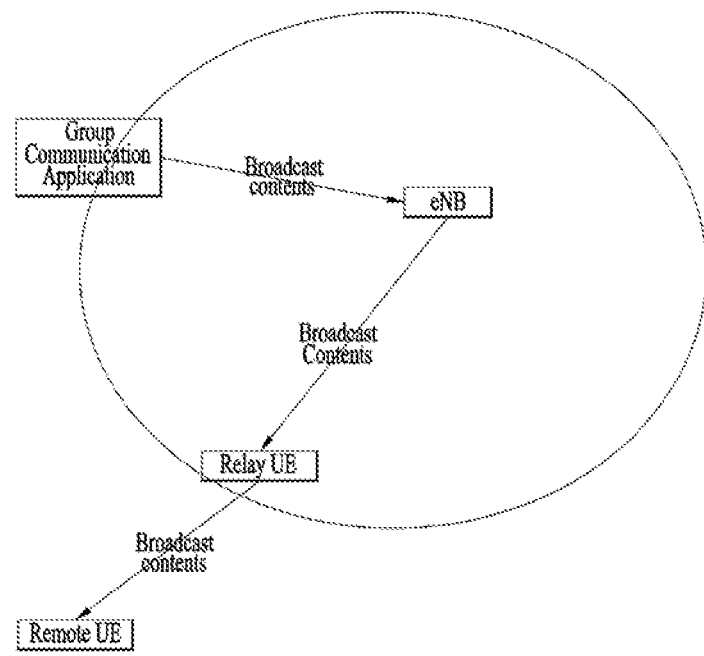

Referring to FIG. 13, a remote UE may discover a relay UE (ProSe UE-to-network relay) and receive a service description (or group communication application MBMS service description) from a group communication application (S1301). Herein, the service description may include a TMGI, frequency information, and/or a Service Area Identity (SAI) (or MBMS SAI), that the UE should use to receive related eMBMS content. The TMGI may be obtained by static configuration or by interaction with the group communication application. This interaction may happen before or after the remote UE joins the relay UE. The remote UE may acquire various information needed to receive an MBMS, in addition to the TMGI, the radio frequency information, and the MBMS SAI information.

The relay UE may receive a TMGI monitoring request from the remote UE (S1302). That is, the remote UE may transmit, to the relay UE, the TMGI monitoring request including the service description obtained in step S1301. In other words, the TMGI and the MBMS SAI included in the TMGI monitoring request may be contained in the service description obtained by the remote UE.

The relay UE may determine whether to provide a service to the remote UE, based on information included in the TMGI monitoring request. Specifically, the relay UE may provide (or determine to provide) a broadcast service to the remote UE, when the MBMS SAI corresponds to an SAI received in System Information Block (SIB) 15. If the relay UE is not provided with the MBMS that should receive for the remote UE in a camped-on cell, the relay UE may be aware of whether the MBMS is provided in other frequencies and transmit an indication of an MBMS in which the relay UE is interested to an eNB. Then, the eNB may handover the relay UE to the corresponding cell.

In this way, when the remote UE transmits the TMGI monitoring request to the relay UE, the remote UE includes the MBMS SAI as well as the TMGI in the TMGI monitoring request. Accordingly, the relay UE may determine whether MBMS traffic requested by the remote UE can be received, using the MBMS SAI information broadcast through SIB 15 (including a list of neighboring frequencies as well as a current frequency, wherein each frequency includes a list of MBMS SAIs supported by this frequency). This shows that the present invention is improved as compared with a conventional TMGI monitoring request which simply includes only the TMGI so that the relay UE cannot correctly provide a service because the relay UE cannot be aware of the relationship between the TMGI and an SIB even when receiving the SIB.

Next, the relay UE may transmit a TMGI monitoring response including a ProSe layer-2 group ID (or ProSe layer-2 group ID_traffic) and/or a TMGI_Monitoring_Refresh timer to the remote UE (S1303). The ProSe layer-2 group ID is used to forward, to the remote UE, eMBMS content related to the TMGI received by the relay UE from the network. The TMGI_Monitoring_Refresh Timer is provided to cause the remote UE to perform a TMGI monitoring request procedure when the timer elapses. If the remote UE does not perform the TMGI monitoring procedure even when the timer expires and other UEs do not perform the TMGI monitoring procedure, the relay UE stops monitoring the TMGI and forwarding any related content.

In step S1304, upon detecting the TMGI (the TMGI has been requested to monitor based on the MBMS service description in the previous step), the relay UE broadcasts a TMGI announcement including a ProSe layer-2 group ID corresponding to the TMGI and the detected TMGI (S1305). Broadcasting may be performed using a direct discovery message. This may be repeated with a configurable repetition interval which is normally smaller than the TMGI_Monitoring_Refresh Timer. The value of the TMGI may be used as a preference criterion for relay selection.

Herein, the TMGI may be requested to be monitored based on the MBMS service description in the previous step. Alternatively, the TMGI may be irrelevant to a TMGI monitoring request/response procedure of the remote UE described above. That is, the TMGI may be detected according to a TMGI monitoring request/response procedure of another remote UE, which is not related to the TMGI monitoring request/response procedure of a specific remote UE. Accordingly, the remote UE which has received the broadcast ProSe layer-2 group ID may receive relayed broadcast content even before receiving the TMGI monitoring response. Alternatively, the remote UE may receive the relayed broadcast content even prior to establishment of a D2D link with the relay UE.

That is, information about the ProSe layer-2 group ID may be transmitted when the TMGI is advertised in step S1305, instead of being transmitted to the remote UE. Alternatively, the information about the ProSe layer-2 group ID is transmitted in step S1303 and may also be transmitted in S1305. Then, the remote UE which is interested in a specific TMGI need not perform the TMGI monitoring procedure (S1302 and S1303) after receiving the TMGI which has already been advertised by the UE-to-network relay. Because the UE-to-network relay receives MBMS traffic for the TMGI from the network and transmits the MBMS traffic through one-to-many direct communication by using the ProSe layer-2 group ID as a layer-2 destination address, the remote UE may receive the MBMS traffic even without performing the TMGI monitoring request procedure. Information about the TMGI_Monitoring_Refresh Timer may also be transmitted in steps S1303 and/or S1305.

In this way, the remote UE may more flexibly and rapidly perform group communication by broadcasting the TMGI announcement including the ProSe layer-2 group ID and the detected TMGI. More specifically, in order for a legacy remote UE to be aware of which packet among packets received through a PC5 interface corresponds to a TMGI that the legacy remote UE desires to receive, the legacy remote UE should have to acquire a ProSe layer-2 group ID corresponding to the TMGI from the relay UE. Accordingly, the remote UE should transmit a TMGI monitoring request to the relay UE to receive a response to the monitoring request. This operation is performed under the premise that the remote UE has discovered the relay UE and then established a one-to-one link with the relay UE. Therefore, when the remote UE i) has not discovered the relay UE yet, ii) has not established a one-to-one link with relay UE, or iii) has not exchanged a TMGI monitoring request/response with the relay UE, the remote UE cannot receive group communication that the remote UE desires to receive.

The TMGI announcement may include a plurality of TMGIs. In this case, waste of a PC5 radio resource, which occurs upon transmitting additional TMGI announcements with respect to every TMGI in order to advertise the TMGIs when the relay UE should receive the TMGIs for the remote UE, may be solved. Further, a problem of affecting other transmission and reception (e.g., actual group communication traffic) occurring when more TMGI announcements should be periodically transmitted can be solved in a state in which the relay UE needs to perform both transmission and reception through a PC5 interface and transmission and reception through an LTE-Uu interface, which cannot be simultaneously performed.

When TMGI information is included in the TMGI announcement, a PLMN ID (i.e., Mobile Country Code (MCC)+Mobile Network Code (MNC)) may not be included. Alternatively, only either the MCC or the MNC may be included in the TMGI announcement. When a plurality of TMGI information is included in the TMGI announcement, TMGIs having the same PLMN ID may be configured to include only one PLMN ID and include only MBMS service ID parts constituting the respective TMGIs. When a plurality of TMGI information is included in the TMGI announcement, TMGIs having the same MCC may be configured to include only one MCC and the other parts constituting the respective TMGIs. When a plurality of TMGI information is included in the TMGI announcement, TMGIs having the same MNC may be configured to include only one MNC and include the other parts constituting the respective TMGIs.

In step S1306, the UE may detect the announcement message of step S1305 and subsequently start to receive the broadcast content on the PC5 ProSe one-to-many link associated with the Prose Layer-2 group ID. In this case, the UE may release a unicast distribution leg to a GCS AS.

In step S1307, upon detection of loss of the TMGI, the relay UE stops broadcasting availability of the TMGI. Optionally, the relay UE may transmit an indication of loss of TMGI in order to detect loss of the TMGI. The UE may request the unicast distribution leg from the GCS AS.

In step S1308, the UE may stop receiving the broadcast content on the PC5 ProSe one-to-many link associated with the Prose layer-2 group ID.

The present invention is applicable to a UMTS/EPS mobile communication system including a 3GPP access network (e.g., UTRAN/GERAN/E-UTRAN) and a non-3GPP access network (e.g., WLAN) without being limited to an LTE/EPC network. In addition, the present invention is applicable to other wireless mobile communication systems in an environment to which network control is applied.

Figure 15:
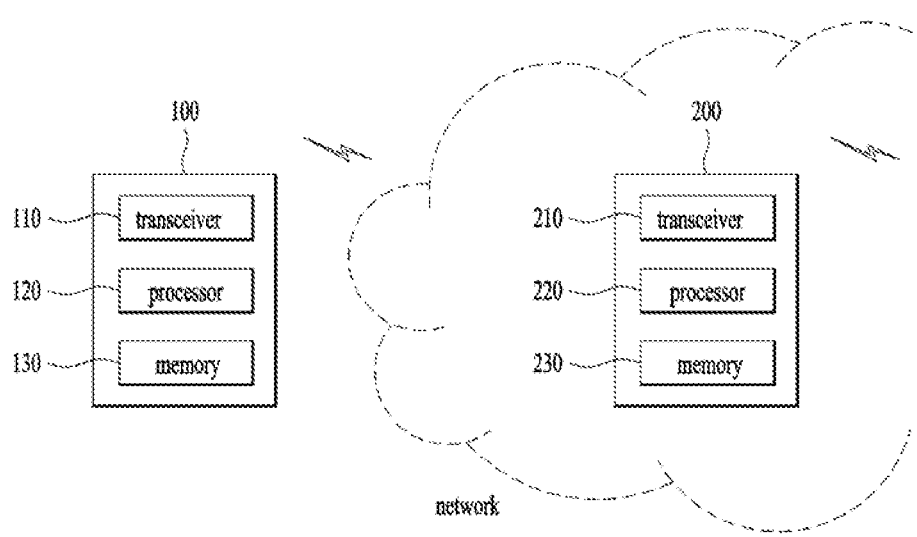
FIG. 15 is a diagram illustrating configuration of a node according to an embodiment of the present invention.

FIG. 15 is a diagram illustrating an exemplary configuration of a UE and a network node according to an embodiment of the present invention.

Referring to FIG. 15, a UE 100 according to the present invention may include a transceiver 110, a processor 120, and a memory 130. The transceiver 110 may be configured to transmit a variety of signals, data, and information to an external device and receive a variety of signals, data, and information from the external device. The UE 100 may be connected to the external device by wire or wirelessly. The processor 120 may control overall operation of the UE 100 and may be configured to perform a function for processing information transmitted from the UE 100 to the external device or from the external device to the UE 10. In addition, the processor 120 may be configured to perform operation of the UE 100 proposed in the present invention. The memory 130 may store the processed information for a predetermined time and may be replaced by a buffer (not shown).

Referring to FIG. 15, a network node 200 according to the present invention may include a transceiver 210, a processor 220, and a memory 230. The transceiver 210 may be configured to transmit a variety of signals, data, and information to the external device and receive a variety of signals, data, and information from the external device. The network node 200 may be connected to the external device by wire or wirelessly. The processor 220 may control overall operation of the network node 200 100 and may be configured to perform a function for processing information transmitted from the network node 200 to the external device or from the external device to the network node 200. In addition, the processor 120 may be configured to perform operation of the network node 200 proposed in the present invention. The memory 230 may store the processed information for a predetermined time and may be replaced by a buffer (not shown).

The detailed configurations of the UE 100 and the network node 200 may be implemented such that the above-described various embodiments of the present invention are independently performed or two or more embodiments of the present invention are simultaneously performed. Redundant matters will not be described herein for clarity.

The embodiments of the present invention may be implemented by various means, for example, hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have focused upon a 3GPP system as described above, the present invention is applicable to various mobile communication systems in the same manner.

The invention claimed is:

1. A method of providing a broadcast service by a relay User Equipment (UE) to a remote UE in a wireless communication system, the method comprising:
   receiving, by the relay UE, a Temporary Mobile Group Identity (TMGI) monitoring request including a TMGI and a Multimedia Broadcast Multicast Service (MBMS) Service Area Identity (SAI) from the remote UE; and
   determining, by the relay UE, whether to provide the broadcast service to the remote UE, based on the MBMS SAI in the TMGI monitoring request,
   wherein the relay UE provides the broadcast service, when the received MBMS SAI corresponds to an SAI received in system information, and
   wherein the relay sends an indication to an eNB for handover of the remote UE to the eNB, when the received MBMS SAI does not correspond to an SAI received in system information.

2. The method according to claim 1, wherein the TMGI and MBMS SAI included in the TMGI monitoring request are included in a service description obtained by the remote UE.

3. The method according to claim 2, wherein the service description is transmitted by a group communication application.

4. The method according to claim 1, wherein the relay provides the broadcast service to the remote UE when the MBMS SAI corresponds to an SAI included in a system information block 15.

5. The method according to claim 1, wherein the relay UE transmits a TMGI monitoring response including a Proximity Service (ProSe) layer-2 group ID to the remote UE.

6. The method according to claim 5, wherein the TMGI and the MBMS SAI constitute one information set and the TMGI monitoring request includes a plurality of information sets.

7. A relay User Equipment (UE) for providing a broadcast service in a wireless communication system, the relay UE comprising:
   a transceiver; and
   a processor configured to:
   receive a Temporary Mobile Group Identity (TMGI) monitoring request including a TMGI and a Multimedia Broadcast Multicast Service (MBMS) Service Area Identity (SAI) from a remote UE, and
   determine whether to provide the broadcast service to the remote UE, based on the MBMS SAI in the TMGI monitoring request,
   wherein the relay UE provides the broadcast service, when the received MBMS SAI corresponds to an SAI received in system information, and
   wherein the relay sends an indication to an eNB for handover of the remote UE to the eNB, when the received MBMS SAI does not correspond to an SAI received in system information.

8. The relay UE according to claim 7, wherein the TMGI and MBMS SAI included in the TMGI monitoring request are included in a service description obtained by the remote UE.

9. The relay UE according to claim 8, wherein the service description is transmitted by a group communication application.

10. The relay UE according to claim 7, wherein the relay provides the broadcast service to the remote UE when the MBMS SAI corresponds to an SAI included in a system information block 15.

11. The relay UE according to claim 7, wherein the relay UE transmits a TMGI monitoring response including a Proximity Service (ProSe) layer-2 group ID to the remote UE.

12. The relay UE according to claim 11, wherein the TMGI and the MBMS SAI constitute one information set and the TMGI monitoring request includes a plurality of information sets.

* * * * *